H. M. KEITH.
Plow Colter.
No. 107,063.                     Patented Sept. 6, 1870.
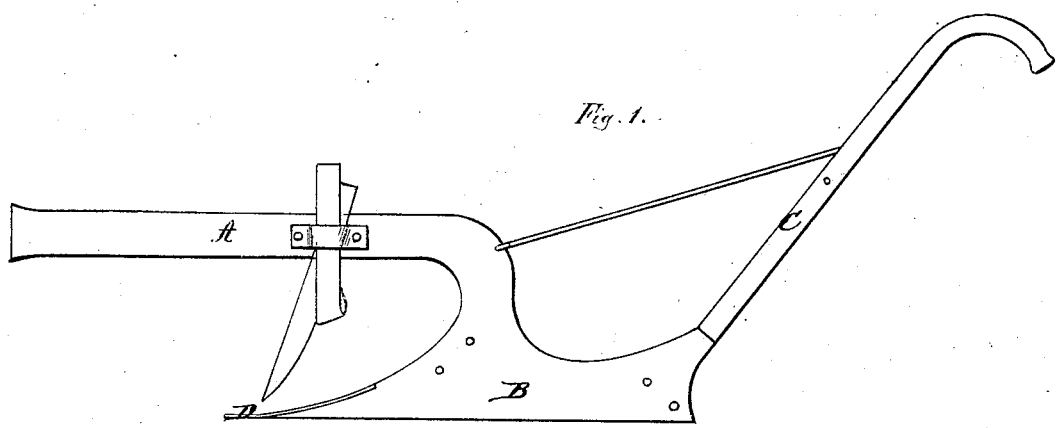
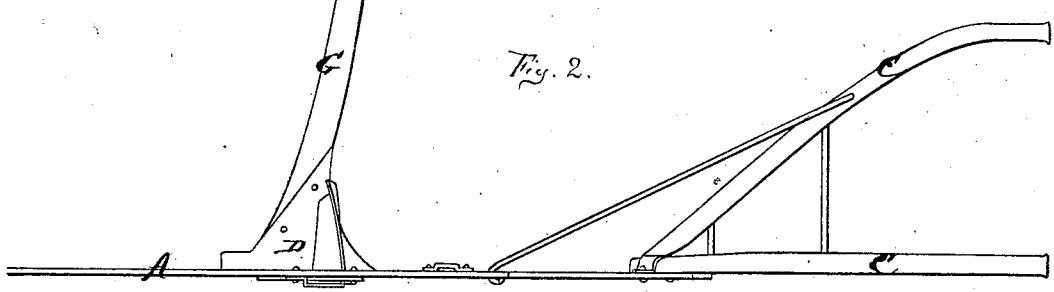
Witnesses:
Chas Jacobs
J. W. White
Inventor:
H M Kieth
Per
J. T. Alexander
Atty

UNITED STATES PATENT OFFICE.

HORACE M. KEITH, OF COMMERCE, MICHIGAN.

IMPROVEMENT IN PLOWS FOR CUTTING POTATO-ROOTS.

Specification forming part of Letters Patent No. 107,063, dated September 6, 1870.

*To all whom it may concern:*

Be it known that I, HORACE M. KEITH, of Commerce, in the county of Oakland and State of Michigan, have invented certain new and useful Improvements in Plows for Cutting Potato-Roots; and I do hereby declare that the following is a full, clear, and exact description thereof, reference being had to the accompanying drawings, and to the letters of reference marked thereon, which form a part of this specification.

The nature of my invention consists in lengthening or extending the point of any plow on the mold-board side a suitable distance, so as to cut the roots of potatoes under the hill, and loosening the hill without moving the same.

In order to enable others skilled in the art to which my invention appertains to make and use the same, I will now proceed to describe its construction and operation, referring to the annexed drawings, in which—

Figure 1 is a side elevation, and Fig. 2 a plan view, of my plow.

A represents the beam, B the landside, C C the handles, and D the point or share, of a plow of any description, the mold-board being removed. To the share D, upon the mold-board side, is attached a piece, G, of iron or steel, about eighteen inches or two feet long and three or four inches wide.

In using this plow, let the landside run a little to one side of the row or hill of potatoes, then the extended share will reach through under the row or hills and cut the roots under the potatoes in the hill loose from the ground, leaving them easy to pull, and loosening the ground, so that the potatoes mostly pull up with the tops. The hill is not moved by the extended plowshare passing through under it, so that the person digging will know where the hill is to dig for any potatoes that may be left after the tops are pulled.

Having thus fully described my invention, what I claim as new, and desire to secure by Letters Patent, is—

The cutter G, secured to or forming a part of the plowshare D, constructed and arranged to operate as and for the purpose specified.

In testimony that I claim the foregoing as my own I affix my signature in presence of two witnesses.

HORACE M. KEITH.

Witnesses:
 A. W. BURTT,
 C. M. BEARDSLY.